Figure 1:
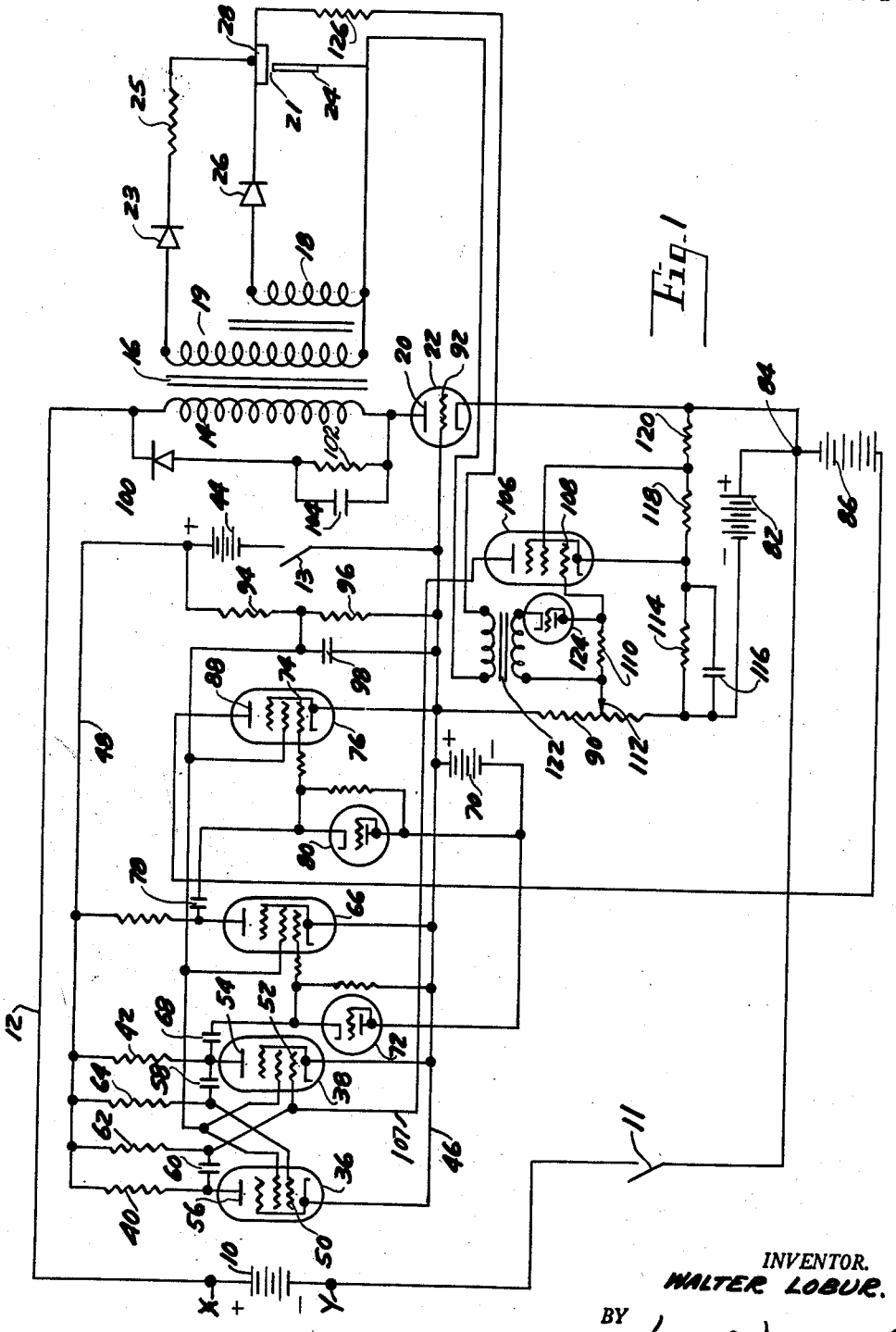

April 13, 1965 W. LOBUR 3,178,607
EDM TIME DELAY BIAS
Filed July 18, 1960 2 Sheets-Sheet 1

INVENTOR.
WALTER LOBUR.
BY
M R Murphy
ATTORNEY

April 13, 1965 W. LOBUR 3,178,607
EDM TIME DELAY BIAS

Filed July 18, 1960 2 Sheets-Sheet 2

INVENTOR.
WALTER LOBUR
BY
ATTORNEY 3,178,607
EDM TIME DELAY BIAS
Walter Lobur, Clawson, Mich., assignor to Elox Corporation of Michigan, Troy, Mich., a corporation of Michigan
Filed July 18, 1960, Ser. No. 43,677
4 Claims. (Cl. 315—102)

This invention relates to improvements in methods and apparatus for electrical-discharge-machining, sometimes referred to as "EDM," "arc-machining," or as "electro-spark machining."

The invention relates particularly to improvements in the circuitry which supplies the machining power and the control power for the automatic power feed of the EDM apparatus.

Because of the highly complex nature of the circuitry of a modern EDM machine, which may embody dozens and sometimes hundreds of electron tubes, difficulties are frequently encountered in turning the machine power supply on and off, particularly when unskilled or inexpert operators are involved. Improper sequence in activating the various components of the apparatus may give rise to conditions dangerous to the operator or to the work being performed or to the power supply itself.

Accordingly, it is the primary object of my invention to provide a control circuit which is operable automatically to energize the various circuit components of an EDM apparatus in a safe manner and in proper sequence upon the main power switch being thrown.

Figure 3:
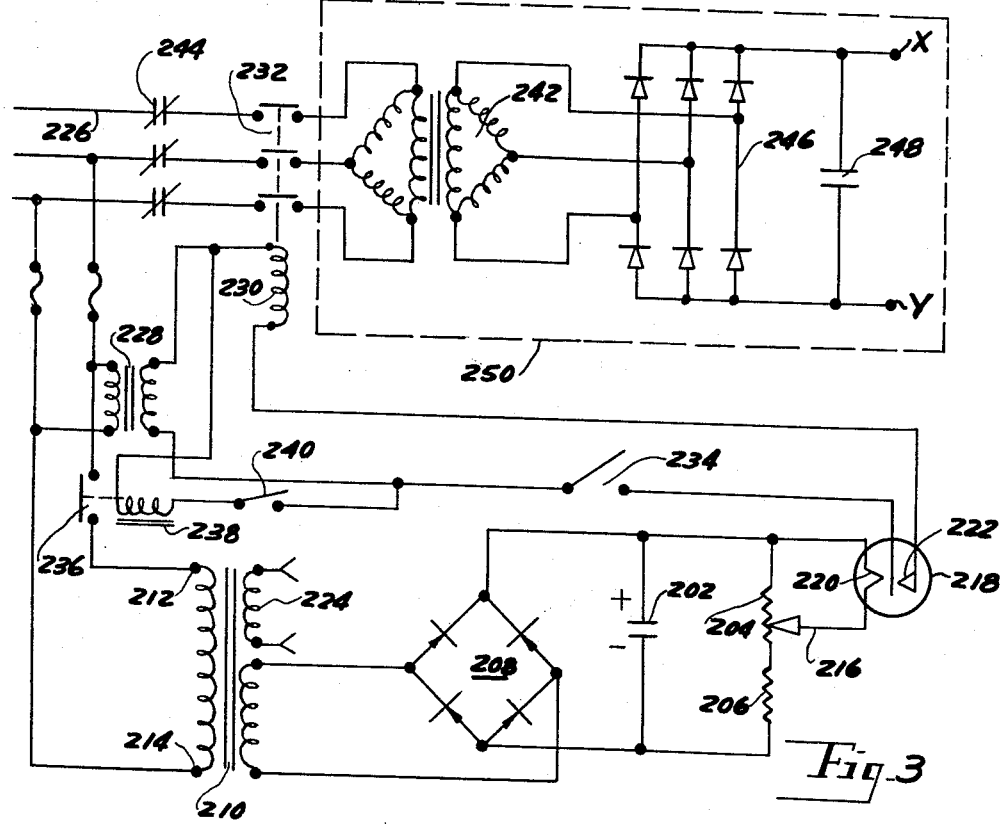
Figure 2:
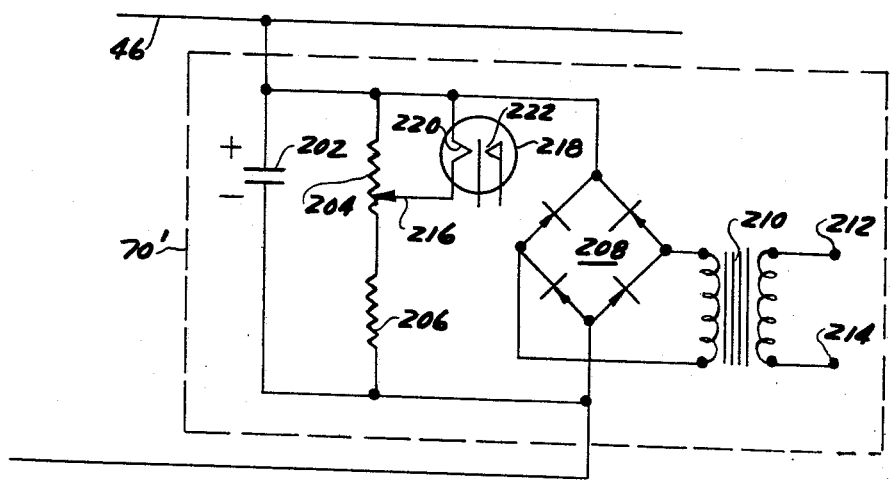

Reference is made to the accompanying drawings for preferred examples of my invention. In the drawings, in which reference characters have been used to designate like parts referred to below, FIG. 1 is a typical EDM power supply circuit of the impedance matching type;

FIG. 2 is a detail circuit of one of the voltage sources of the FIG. 1 circuit; and FIG. 3 is a specific example of a more complete voltage source.

It will be understood that in the apparatus about to be described, automatic servo power feed of the machining electrode is contemplated, in accordance with present day practice in the EDM art. The details of such a power feed have been omitted in the interest of brevity, and reference is made to the copending applications, Serial No. 805,989, filed April 13, 1959, and Serial No. 15,505, filed March 16, 1960, and assigned to the assignor hereof, for examples of power feeds suitable for use with the apparatus herein described.

Referring to FIG. 1, it will be seen that I have shown at 10 the main power supply for the apparatus, which comprises a 300 volt, D.C. supply, this voltage being about maximum for the plate supply of the 6AS7 power tubes. A main switch 11 is provided for opening the circuit from the main supply. A lead 12 from the positive side of the power supply connects to one side of primary 14 of the power transformer 16. The latter has a secondary 18 and is of the iron-core type, although an air-core transformer may be used for more delicate machining, particularly finishing operations.

An additional secondary winding 19 of relatively low power, high voltage characteristic is connected in parallel with the machining gap 21 through a rectifier 23 and a resistor 25.

The other side of primary 14 is connected to the anode 20 of a power tube 22. It will be understood that the tube 22 represents a bank of tubes (in this instance 6AS7's) connected in parallel. Almost any number of such tubes may be so connected to provide the required power flow through the gap.

The secondary 18 of the power transformer 16 is connected at one side to the electrode 24, and at the other side to a workpiece 28 through a blocking diode 26.

The power tube bank 22 is controlled by a multivibrator network which comprises tubes 36 and 38. These tubes are preferably pentodes, type 6DQ5. The plates or anodes of these tubes are connected through load resistors 40, 42, and lead 48 to the positive terminal of a suitable power supply 44, the negative terminal of which is connected with the cathodes of the tubes by lead 46. The power supply 44 may be separate or it may be derived from the main supply 10 as desired.

The control grids 50, 52, of the tubes 36, 38, are cross-connected to the anodes 54, 56, respectively through coupling condensers 58, 60, and are connected to the positive side of the multivibrator power supply through the grid resistors 62, 64.

The output signal from multi-vibrator tubes 36, 38, is fed into an amplifier, which may comprise one or more pentode tubes 66, through condenser 68 and clamped to negative bias voltage 70 through diode 72. The amplified and resquared signal from tube 66 is fed to the grid 74 of pentode 76 (which may be one of a bank) where it is again amplified before being fed to the power tube bank 22. The coupling to the "driver" tube 76 is through a coupling condenser 78 and a clamping diode 80 is provided to insure positive cut-off characteristic. Suitable isolation and signal resistors are also provided as shown to control the operating characteristics of diodes 72 and 80.

The power required to drive the main power tube bank 22 is in the order of several hundred watts, and to obtain increased efficiency, the amplifier 76 is floated in the grid circuit of the bank 22 rather than connected to the negative terminal of bias supply 82 as would be expected. Since the control signal appears between the cathode of driver 76 and point 84 of the circuit which is grounded, the network just described, which comprises a multivibrator and two stages of amplification, may be thought of as a floating signal source.

The output signal from this network is of rectangular wave form and is of substantially greater magnitude than that obtained from the conventional square wave generator. Normally these signal generators have an output of approximately ten watts. In the EDM circuit of FIG. 1, the power required to drive the grids of the tube bank 22 is in the order of two hundred watts and more. A booster power supply 86 is preferably provided in series with the bias supply 82 to provide adequate voltage for the plate 88 of driver 76.

The output signal from driver tube 76 is developed from the voltage drop across variable resistor 90, which signal pulse with the added voltage of power source 82 constitutes the drive to the grids 92 of the bank 22. Proper adjustment of the circuit parameters will provide a signal at grids 92 having a selected on-time characteristic.

As stated above, the signal generator power supply is the source 44. Resistors 94 and 96, the latter being shunted by a condenser 98, are provided as shown.

The primary 14 of transformer 16 has a damping network consisting of diode 100, resistor 102 and shunt capacitance 104 connected in shunt therewith.

The transformer 16 must be a stepdown transformer capable of handling relatively high currents at relatively high frequencies. The development of extremely thin iron lamination stock and specialized design now makes possible the design of transformers having the characteristics required for the circuit of FIG. 1. The transformer selected should have a maximum voltage swing on the primary equal to the peak voltage rating of the power tube selected and a turns ratio which will match the gap voltage required in EDM.

The aforementioned damping network limits the induced voltage or negative fly-back in the primary 14, which occurs between power pulses, to the voltage rating of the tubes 22 and this prolongs the lives of these tubes.

As so far described, it will be seen that the tube bank 22 normally is biased to non-conducting condition by voltage source 82. An amplified signal from the multivibrator will be impressed on the grids 92 of the power bank 22 and will overcome the normal grid bias and render the tube bank conductive. In accordance with the preselected adjustment of the circuit parameters, a voltage will occur across the primary 14 which will induce a voltage in the secondary 18 of desired characteristic. This secondary voltage is instantly effective across the gap between electrode 24 and workpiece 28, and a power pulse will be delivered across the gap eroding the workpiece. At the same instant, the full voltage of secondary 19 is applied to the gap in parallel with the pulse from winding 18. Once the gap is fired, the current buildup will, for all practical purposes, cut winding 19 out of the circuit because of the loading of the resistor 25. Substantially all of the power to the gap will be delivered by winding 18. The characteristic of winding 19 may be chosen to provide almost any desired striking voltage as this higher voltage is blocked from winding 18 by rectifier 26. This permits the latter winding to be designed for optimum power delivery to the gap. This sequence is repeated at high frequency until the machining operation is completed or the operation interrupted by the machine's power feed, as is known in the art.

The gap between electrode 24 and workpiece 28 is flooded with dielectric fluid during machining as is common in EDM.

The circuit of FIG. 1 includes a "watch-dog" which functions automatically to cut-off the power to the gap in event of a short circuit condition, which might damage the workpiece, or in event of malfunction of the apparatus, which might cause damage to the workpiece or to the components of the apparatus.

This "per pulse cut-off" comprises a pentode 106, the control grid 108 of which is connected through a resistor 110 to tap 112, which latter taps the keying resistor 90 at an intermediate point. The grid 108 normally is biased non-conducting by the shunt resistor and condenser network 114, 116, which is connected across the voltage source 82 through the screen voltage resistor 118 and the voltage reducing resistor 120. The voltge across resistor 90 plus that of the source 82 is, of course, the voltage which drives the grids 92 of the power tube bank 22. A selected portion of this voltage is thus effective on the grid 108 of cut-off tube 106 and tends to render tube 106 conductive whenever bank 22 is rendered conductive. The plate of tube 106 is connected to the grid circuit of multivibrator tube 38 by line 107 and conduction through tube 106 will instantaneously cut-off operation of the multivibrator.

However, the secondary of a transformer 122 (called for convenience the "cut-off transformer") is connected across the resistor 110 through a blocking diode 124. The primary of the transformer 122 is connected across the gap between electrode 24 and workpiece 28 through a limiting resistor 126.

If the apparatus is functioning normally, a drive signal on grids 92 of the bank 22 will result in a striking voltage appearing across secondary 19 of power transformer 16 and the gap will fire. This voltage would have to be only about 20 volts if there were no losses in the firing circuit. However, normal circuit losses require a voltage magnitude of 60 volts or more, and should a short circuit occur across the gap, the short circuit current would be almost 150% of normal. With narrow pulse operation, the peak current selected is usually the peak pulse rating of the individual tubes of the power tube bank, and a 150% overload of this pulse current would strip the tube cathodes with comparatively few pulses. Thus ordinary short circuit cut-off devices, such as thermally responsive devices, operate too slowly to provide protection.

The per-pulse cut-off device permits the power circuit to be operated with maximum efficiency because it renders it unnecessary to limit the power input to the gap to less than maximum desired on account of possibility of short circuits. The cut-off device operates to cut off the power input instantaneously, that is to say, in about 5% of the period of a power pulse, and thus provides complete safety to the apparatus. This cut-off device is extremely important in the operation of the machine especially when precision machining of expensive workpieces is being performed, where heat checking of the hole being cut might require scrapping of the piece. The readiness of the device to function instantly is constantly maintained by the precise balancing of the circuit parameters. The connection of grid 108 to the keying resistor 90 tends to render tube 106 conductive each time the multivibrator pulses, but the dominating negative bias of the network 114–116 inhibits conduction of tube 106 in the absence of any keying signal. During normal operation, the keying pulse voltage developed across resistor 90 is exactly neutralized in the grid circuit of tube 106 by the action of circuit 122, 124, 110. However, appearance of a voltage across primary of transformer 122 (gap voltage) lower than a preset minimum will upset this voltage balance and instantaneously cause tube 106 to conduct and cut off the multivibrator through line 107. It is, of course, clear that the "leading edge" of the power pulse just initiated will cross the gap, but the cut-off is so fast that the power pulse will be literally squelched after initiation and no appreciable power will be delivered to the gap.

Interruption of operation of the multivibrator will, of course, cut off tube bank 22 as well as tube 106. After the normal pulse repetition delay time, the multivibrator will resume pulsing, and if the trouble in the gap which caused the abnormal low voltage has cleared, such as by back-up of the power feed, clearing of sludge, or the like, normal machine operation will be restored automatically.

It will be understood that the cut-off circuit shown is not limited to use with the particular power delivering circuit shown. It would be equally useful with other gap power circuits whether of the impedance matching type or not.

Reference is now made to FIG. 2 which is a schematic circuit of the voltage source 70 of FIG. 1 as it appears in accordance with my invention. It should be understood that the entire assembly 70' of FIG. 2 is substituted for the voltage source 70 of FIG. 1.

If desired or necessary, the assembly 70' may be substituted also for the voltage source 82 of FIG. 1, and the same principles set forth below will apply.

It is a well known basis of electronic design that vacuum tubes and filament type gas tubes require a warmup time in which the heater is energized for some period of time prior to application of output power or at least prior to operation of the equipment. In most circuits, and with most types of devices, it is necessary that the required warmup time is achieved prior to the application of plate voltage. Normally, this is accomplished with any of several time delay devices. In most instances, these time delay devices are low voltage A.C. devices, operated directly with the filament power of a particular machine. As filament voltage is applied in the initial act of turning ON the machine, this same power is also applied to the time delay circuit which is, in most cases a thermally operated switch similar to time delay switch 218 shown in FIG. 2. Normally heater 220 of this switch is energized by filament voltage at the same instant the filaments are turned ON and after the appropriate time delay cycle determined by the design of the particular time delay switch, contacts 222 energize and either close or open depending upon the particular choice of control circuits. A typical device in use is 6NO45 or 6NC45 in which the numeral "6" stands for the nominal filament voltage and can be either an A.C. or D.C. rating; the "NO or NC" of course stands for the normal condition of contacts, being either normally open or normally closed and the last number, in this example "45," is the number of seconds of time delay between application of power to the heater winding and operation of the control contacts. Normally the switching circuitry associated with the transformer and power voltage on the filament winding is a secure item not likely to fail and the types of failure that would normally cause filament power not to be turned ON would also fail to energize the circuitry of FIG. 2. In the circuitry of FIG. 1, it is essential that bias be applied particularly to the power tube stages of that circuitry before plate voltage is applied. Otherwise, even during a transient condition of zero bias, extreme overloads would occur damaging the particular tubes in question. For this reason, application of bias prior to application of plate voltage is even more important than application of filament power and furthermore its absence is far more damaging if plate voltage is turned ON in the absence of bias.

In the circuitry of FIG. 2, line 46 corresponds to grid line 46 of FIG. 1 and bias assembly 70' corresponds to that same assembly shown in FIG. 1 as 70. Similar circuitry may be used for bias supply 82 of FIG. 1. The details of this particular invention are concerned with the particular bias circuitry and the means of developing this bias. In the performance of this circuitry, A.C. lines 212 and 214 of transformer 210 are energized from the same source and at the same time as filament power is applied to the circuit. The filament energizing circuit has been omitted from FIG. 1 for the purpose of simplification, it being standard and well known in the art. Normally, rectifier 208 produces a D.C. voltage across condenser 202 which is subsequently loaded by potentiometer 204 and resistor 206. This pre-loading of resistor 206 and potentiometer 204 is essential for proper operation of the equipment since grid current of each of the respective tubes or stages of this, or any electronic device, flows through this supply in a charging rather than a discharging manner. For example, in FIG. 1, grid current of tube 76 flows from grid 74, diode 80, to the minus terminal of supply 70, the positive terminal of supply 70, to the cathode of tube 76. This direction of electron flow is just opposite that if bias supply 70 were a source and therefore resistor 206 and potentiometer 204 must be selected such that the total load presented by these series resistors is capable of conducting all of the combined grid current of every stage. If these resistors were too high in value, the effect would be that bias supply 70 and rectifiers 208 would be de-coupled and would thereby assume an uncontrollable magnitude of bias, resulting in failure or poor operation of the equipment. For this reason, shunt resistors 204 and 206 are essential and it is essential that they be at least equal to the power requirements of the bias supply. As grid current flows from any particular stage, the load on rectifiers 208 is decreased rather than increased. For a properly designed supply, however, the voltage across condenser 202 is reasonably constant. If, during turn ON of the equipment, potentiometer arm 216 is properly adjusted to tap off the required voltage for proper operation of time delay switch 218, the time delay characteristic of this circuit is identical to that of the filament time delay circuit. Furthermore, in the malfunction or open circuit or short circuit of rectifiers 208, condenser 202 or resistors 206 and 204, this time delay device will fail to be energized, thus by safety contacts 222 making it impossible to turn ON the main power which in this instance would be power voltage 10 in the circuit of FIG. 1 and driver supply 44 of that circuit.

A further advantage of this circuit is that potentiometer arm 216 may be adjusted lower than the normal voltage rating of heater 220 such that even slight decreases in bias voltage will prevent actuation of contacts 218 or cause interruption if bias falls to too low a value.

In actual practice, the sequence of turning the machine ON may vary in accordance with the particular apparatus and its use. In the apparatus being described, the usual procedure would be for the operator to energize the time delay circuit of FIG. 2, by closing a switch (not shown) which would energize the primary of transformer 210. As soon as the heater 220 had closed the contacts 222, the operator would then press the ON button which would operate the switches 11 and 13 (FIG. 1) thus putting voltage sources 10 and 44 in the circuit. The contacts 222 when closed energize the interlock coil in the main contactor and until this coil is energized, pressing on the ON button has no effect. FIG. 3, referred to below, shows an example of the complete power supply circuit.

As mentioned earlier, it is extremely rare for failure to occur in the application of filament voltage. However, it is much more common in terms of electronic failure for some malfunction to occur in the bias network represented by rectifier 208, condenser 202, and a voltage divider herein embodied as a bleeder resistor including resistors 204 and 206. Should any of these units short circuit or open circuit or materially change value, safety and operation of the equipment is severely impaired. This generally does not happen in a filament winding. It is extremely common for filaments to burn out and be open circuited, but that would in no way affect application of filament voltage to the corresponding tube. This circuit employs commercially available time delay devices operated in conjunction with the extremely vital function of bias to achieve proper time delay before turn ON of the particular power voltage. In the particular circuitry of FIG. 1, both bias source 70 and bias 82 should be energized for proper operation of the equipment. In fact, in this particular circuitry, failure of bias 82 is even more drastic than failure of bias supply 70 and it may be desirable to have such a protection circuit in each bias supply.

Referring now to FIG. 3, it will be seen that I have shown a specific example of a suitable EDM power supply circuit embodying the present invention.

In FIG. 3, the elements 202 to 222 are the same as shown in FIG. 2 except that the transformer 210 has an additional secondary winding 224 for supplying the filaments of the various tubes. The line supply is a three phase source 226, preferably of 230/460 volts A.C. The primary of transformer 210 is connected across one phase of the line, as is also the primary of transformer 228. The latter supplies 110 volts (preferably) to the coil 230 which actuates the main contactor 232 when the contacts 222 are closed. An optional manual switch 234 may be provided in this circuit if desired.

A filament start switch 240 is manually operable to energize coil 238 which closes contacts 236 to close the circuit across terminals 212–214 of transformer 210.

It will be seen that closing of switch 240 will cause the tube filaments and the heater 220 to be energized. As soon as the heater 220 closes contact 222, coil 230 may then be energized by closing switch 234 to close contactor 232 and three phase transformer 242 will be energized through the overloads 244. This, in turn, will supply the voltage 10 (FIG. 1) through the rectifier 246 and storage condenser 248. The dotted line 250 of FIG. 3 encloses the apparatus which is represented by the battery symbol 10 of FIG. 1. Terminals X and Y are shown in FIGURES 1 and 3 to clarify the circuit connections utilized.

It thus will be seen that I have provided an improved safety time delay device for EDM apparatus which requires sequence switching of the tube bias supply and filament supply simultaneously before the main power voltage of the circuit is made available. This assures complete safety to the expensive equipment, the workpiece (which may be also extremely costly) and to the operator.

I claim:

1. A control circuit for an electrical discharge tube comprising an anode, a cathode, and a grid electrode thereof, an A.C. source, a first transformer primary connected across said source, a second transformer primary connectable across said source, a cathode heater secondary and a grid bias secondary cooperable with said first primary, an anode connected secondary cooperable with said second primary, first switching means for connecting said first primary to said A.C. source, a rectifier connected to said grid bias secondary operative to produce a D.C. bias, a bleeder resistor connected across said bias, a heater of a thermally operated delay connected across a predetermined portion of said resistor, second switching means controlling the coupling of said second transformer primary to said A.C. source, and a pair of normally open contacts controlled in their closure by said heater and operable to initiate the operation of said second switching means.

2. The combination as set forth in claim 1 wherein said first switching means includes a manually operable switch and said second switching means includes an electromagnetic relay having its coil connected in series with said normally open contacts.

3. The combination as set forth in claim 2 wherein a smoothing condenser is connected to the output of said rectifier and in parallel with said resistor.

4. The combination as set forth in claim 2 wherein said second switching means is energizable through a third primary connected across said A.C. source.

References Cited by the Examiner
UNITED STATES PATENTS

| | | | |
|---|---|---|---|
| 1,751,374 | 3/30 | Waltemath | 315—102 X |
| 2,073,701 | 3/37 | Lazzarini | 315—102 |
| 2,549,807 | 4/51 | Heed | 315—102 |
| 2,629,070 | 2/53 | Holmes et al. | 315—102 |
| 2,773,168 | 12/56 | Williams | 219—113 X |
| 2,794,109 | 5/57 | Martin | 315—291 X |
| 2,871,410 | 1/59 | Matulaitis | 315—135 X |

GEORGE N. WESTBY, *Primary Examiner.*

RALPH G. NILSON, *Examiner.*